US009635562B2

(12) United States Patent
Da Torre et al.

(10) Patent No.: US 9,635,562 B2
(45) Date of Patent: Apr. 25, 2017

(54) METHOD FOR PREDICTING THE RADIO FIELD LEVEL AND/OR THE DURATION OF PROPAGATION OF CELLULAR TELEPHONE NETWORKS USING HIGH-RESOLUTION TERRAIN DATABASES

(71) Applicant: Google Inc., Mountain View, CA (US)

(72) Inventors: Serge Barbosa Da Torre, Marseille (FR); Imad Fattouch, Paris (FR); Norbert Barbosa Da Torre, Tregastel (FR)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/774,537

(22) PCT Filed: Mar. 13, 2014

(86) PCT No.: PCT/FR2014/050584
§ 371 (c)(1),
(2) Date: Sep. 10, 2015

(87) PCT Pub. No.: WO2014/140495
PCT Pub. Date: Sep. 18, 2014

(65) Prior Publication Data
US 2016/0037357 A1  Feb. 4, 2016

(30) Foreign Application Priority Data
Mar. 13, 2013  (FR) ...................... 13 52242

(51) Int. Cl.
*H04W 40/00* (2009.01)
*H04W 16/18* (2009.01)
*H04W 16/26* (2009.01)

(52) U.S. Cl.
CPC ............ *H04W 16/18* (2013.01); *H04W 16/26* (2013.01)

(58) Field of Classification Search
CPC ..... H04W 16/00; H04W 16/18; H04W 16/20; H04W 16/22; H04W 16/24; H04W 24/02; H04W 24/06
(Continued)

(56) References Cited

U.S. PATENT DOCUMENTS

2009/0144037 A1* 6/2009 Sibecas ............... G06F 17/5009
703/6
2010/0232529 A1* 9/2010 Fettweis ................ H01Q 1/246
375/260

(Continued)

FOREIGN PATENT DOCUMENTS

EP   2 230 863 A2   9/2010
WO   97/04497 A1   2/1997

OTHER PUBLICATIONS

International Search Report, dated Jun. 6, 2014, from corresponding PCT Application.

(Continued)

*Primary Examiner* — Temica M Beamer
(74) *Attorney, Agent, or Firm* — Honigman Miller Schwartz and Cohn LLP (57) ABSTRACT

A method of predicting the level of radio field and/or the duration of radio propagation of a mobile telephone network for the coverage of a cell using the ray tracing technique and utilizing geographical databases, wherein the database directly utilized is a matrix base composed of pixels, each pixel carrying at least an information item specific to the type of ground cover and an information item specific to the height of the ground cover, a vectorization processing is applied to the matrix base to linearize the contours of obstacles encountered while rays are fictitiously traced, the rays according to the obstacles encountered being either reflected or diffracted and scattered, while the global attenuation and/or propagation duration is calculated, the vector- (Continued)

ization processing of the contours of obstacles being applied to matrix bases to linearize the contours of obstacles encountered by forming straight lines whose positions and various angles are known accurately.

9 Claims, 4 Drawing Sheets

(58) Field of Classification Search
USPC .................. 455/446, 67.11, 67.13, 67.16
See application file for complete search history.

(56) References Cited

U.S. PATENT DOCUMENTS

| | | | |
|---|---|---|---|
| 2011/0153294 A1* | 6/2011 | Yoon | H04W 16/22 703/6 |
| 2013/0281100 A1* | 10/2013 | Lanzo | H04W 16/18 455/446 |

OTHER PUBLICATIONS

Combeau P et al: "Efficient 2-D ray-tracing method for narrow and wideband channel characterisation in microcellular configurations", IEE Proceedings: Microwaves, Antennas and Propagation, IEE, Stevenage, Herts, GB, vol. 153, No. 6, Dec. 4, 2006 (Dec. 4, 2006), pp. 502-509, XP006027746, DOI: 10.1049/IP-Map:20045142.

Corre Y et al: "Three-Dimensional Urban EM Wave Propagation Model for Radio Network Planning and Optimization Over Large Areas", IEEE Transactions on Vehicular Technology, IEEE Service Center, Piscataway, NJ, US, vol. 58, No. 7, Sep. 1, 2009 (Sep. 1, 2009), pp. 3112-3123, XP011267703, DOI: 10.1109/TVT.2009.2016973.

Zhihua Lai et al: "A new approach to solve angular dispersion of discrete ray launching for urban scenarios", Antennas&Propagation Conference, 2009. LAPC 2009. Loughborough, IEEE, Piscataway, NJ, USA, Nov. 16, 2009 (Nov. 16, 2009), pp. 133-136, XP031579650, ISBN: 978-1-4244-2720-8.

* cited by examiner

METHOD FOR PREDICTING THE RADIO FIELD LEVEL AND/OR THE DURATION OF PROPAGATION OF CELLULAR TELEPHONE NETWORKS USING HIGH-RESOLUTION TERRAIN DATABASES

TECHNICAL FIELD

This invention advantageously applies to the phase of characterizing and establishing mobile telephone networks to be installed on a territory and more particularly it relates to a method for predicting the level of radio, electromagnetic or sound fields using a propagation model based on the technique of ray-launching by utilizing high-resolution terrain databases in environments such as, for example, high-density urban environments. With a purpose of simplification and this, in order to better understand the invention, the expression "prediction of the field level" is chosen in the preamble. However, it must be well understood that this expression, which is voluntarily concise, encompasses and responds not only to the notion of field level as such, but also to the various other characteristics of said field such as, among others, the propagation time of the radio signal or the time profile of the channel. In accordance with this, advantageously, implementing the invention will make it possible, according to a first branch, to determine, easily and effectively, operating parameters and optimum positions of the stations or repeaters of the network in such a way as to accurately define the limits of the corresponding radio cells and as such optimize the use of the radio resources allocated to the mobile service. Likewise and according to a second branch, implementing the invention will make it possible, as such and if desired simultaneously, to predict the duration of propagation of the signal and the time profile of the channel. The knowledge of these characteristics is of the greatest importance in relation to applications such as geo-location methods based on triangulation techniques and equally important to the estimations of the radio channel in order to characterize the channel and performance relating to multiple-antenna systems such as MIMO (Multiple-Input Multiple-Output) or other applications that require such information. In the case also, where multi-antennas of the MIMO type are used, in order to advantageously obtain a time and angular profile of the channel, it is possible and useful to use the analysis conducted by means of ray-launching propagation models in order to deduce and therefore to know not only the field level and durations of propagation, but also the outgoing (emitting) and incoming (receiving) radio angles of incidence.

PRIOR ART

Ray-launching propagation models are largely known and very commonly used in a multitude of applications, in particular in the predictive evaluation of the radio coverage of a cell in the network definition phase. These are deterministic models, with these models based on precise knowledge of the environmental reality and requiring the availability of geographical databases of the building contour type. They make it possible to predict the various propagation paths in a given configuration. After the adjustment of the frequency band considered, these models also make it possible by simulation to conduct parametric studies in order to analyze, for example, the influence of antenna patterns or characteristics of the materials, which is very significantly less expensive than launching a large number of measuring campaigns.

Recall that the radio propagation in a cell must satisfy the two essential requirements which are the emission of a non-excessive power level by the station and the reception by the terminals of radio signals that are sufficiently powerful, with each one of these requirements satisfying specifications that are based on a certain number of characteristic values that are not to be exceeded. For example, an increase in the emitting power of a station would inevitably increase the size of the cell, provoking interference between neighboring cells. Also, with regards to mobile terminals, the maximum power has to be limited by safety imperatives concerning the users and by the autonomy of their batteries.

Various methods for predicting the level of radio, electromagnetic and sound fields are known and used among which one of great effectiveness which consists in carrying out a predictive calculation of the attenuations and/or the duration of radio propagation at a plurality of points of the cell by using a vector database provided, for example, by the Institut Géographique National (IGN), this vector database representing buildings and other land cover in the geographical zone to be analyzed. A vector database is defined as a set of polygons each representing a geographical object associated with one or more items of qualitative and/or quantitative information. For example, a polygon can represent the contour of a building and can be associated with an item of information of the height of this building, or the polygon can represent a façade of a building, in which case a set of polygons can accurately define a building in 3 dimensions. Also, a polygon can represent a tree with an item of information of height, or a polygon can represent a zone with vegetation with an item of information of the average height and of the density of the vegetation. More generally a polygon or a set of polygons, possibly associated with quantitative information, makes it possible to define the limits of a geographical object in a 3-dimensional space. In order to estimate the predictive attenuation and/or the duration of radio propagation at any point of the cell, a simulation of the propagation of radio signals is carried out. The propagation is modelled by fictitiously launching, by means of a calculator of a production chain of radio coverage predictions, an electromagnetic ray from the station, in determined directions, then its propagation conditions in the elementary solid angle that it occupies are calculated. Except for free-space propagation when the station is in direct line-of-sight of a fictitious radio terminal which is a known linear attenuation propagation and of duration of radio propagation that depends on the distance traveled, the trajectory of the rays encounter obstacles that attenuate it, deviate it and delay it additionally, in particular in the microcells of which the stations are often at a height that is less than that of the roofs of the buildings. As such, in a street, a ray can be deviated by reflection or diffraction/scattering and the opening of its solid angle can even be increased. International application WO-A-97/4497 discloses such a method. Although this technique is effective, it has major disadvantages by the simple fact that it requires the availability of vector databases in order to perform the modeling of all of the contours of the buildings. However, these vector databases are expensive to produce and maintain and are furthermore extremely cumbersome to manage and utilize, involving prohibitive calculation times when they are used for the processing of an application for predicting the radio field level and/or the duration of radio propagation in mobile telephone networks.

DISCLOSURE OF THE INVENTION

This invention has for purpose to propose an efficient solution to the problems and disadvantages presented by the various techniques of prior art and in particular the technique utilizing vector databases. This invention aims as such to very significantly reduce the calculating power required for predicting the radio coverage of a cell in such a mobile network while still having the same effectiveness as with the techniques that directly utilize vector databases and by making it possible, when this is desired, to utilize the method of predicting the radio field level and/or the duration of radio propagation for mobile telephone networks during an analysis in real time.

For this, according to the invention, the method for predicting the radio field level and/or the duration of radio propagation of a mobile telephone network for the coverage of a cell using the technique of ray-launching and utilizing geographical databases is noteworthy in that the database directly utilized is a grid of pixels, with each pixel carrying at least two items of information, an item of information specific to the type of land cover and an item of information specific to the height of the land cover, a vectorization processing is applied to the grid of pixels to linearize the contours of obstacles encountered while rays are fictitiously launched, the rays according to the obstacles encountered being either reflected or diffracted and scattered while the global attenuation and/or the duration of radio propagation are calculated, the vectorization processing of the contours of obstacles being applied to the grid of pixels to linearize the contours of obstacles encountered by forming straight lines whose positions and angles are known accurately, with these straight lines accurately describing the position and the orientation of the façades of the obstacle encountered.

As such, the method for predicting the radio field level and/or the duration of radio propagation according to the invention which uses a ray-launching propagation model that advantageously uses grid of pixels is extremely fast, while still being accurate, operational and very easy to utilize. This method can be applied to all radio technologies, as it is based on an entirely new concept of modeling the propagation in dense urban environments with high-resolution terrain databases.

In summary, the main advantages that this new method offers are the following. The rapidity of the calculation, an essential characteristic due to the fact that it uses a technique based on a grid and not vector sampling of the angles of the façades and of the corners of buildings. High accuracy as the model takes into account all of the aspects and phenomena of the radio propagation in order to deliver results with extreme accuracy. The resulting model is accurate for antennas over roofs for which the signal substantially comes from the vertical diffraction, but also for the antennas below roofs for which the signal mostly comes from horizontal diffractions, reflections and scatterings. Finally the method is immediately operational and easy to use as it is compatible with all of the mobile technologies such as 2G, 3G, 4G, WiMax, LTE, DVB, etc. and this, in the whole range of frequency spectrum. The system implementing the method can be provided with pre-calibrated parameters which are intuitive and easily accessible and understandable. Finally, this system favourably supports an intuitive interface for self-calibration. Self-calibration is a function that allows for automatically finding the best parameters for a prediction model and this by using actual field measurements. As such the prediction model contains a function that allows the measurement points to be analyzed and to find the best parameters of the model allowing the predictions to be as close as possible to the measurements, with the comparison being made on the mean error and the standard deviation for example.

According to an embodiment of the method for predicting the radio field level and/or the duration of radio propagation according to the invention, before the fictitious launching of rays, a vectorization preprocessing of the contours of obstacles is applied to the grid of pixels to linearize the contours of obstacles encountered by taking into account only the objects that represent the obstacles and as such retrieve said contours of obstacles, this on the one hand by identifying the pixels having a non-zero height as belonging to obstacles and on the other hand by identifying straight-line segments of which the positions and angles are known with precision, with these straight-line segments describing the position and the orientation of the façades of said obstacles, with this vectorization preprocessing being adapted to drive the ray-launching once the vector information proper to the types, i.e., inside, façade or corner of an obstacle and proper to the angles, i.e., façade angle or corner angles, this for each pixel, has been extracted, in order to form a grid of the types and a grid of the angles and predict according to these grids the reflection, the diffraction and scattering for each ray launched and enable the calculation of the global attenuation and/or the radio propagation time.

According to a second embodiment of the method according to the invention, a fictitious ray is launched directly over the grid of pixels in a direction of a solid angle, covering the space of said solid angle, with its path being at each point scanned and each time that said ray encounters an obstacle and that a point of impact is detected, with this detection carried out by comparing the height of the ray with the height of the point considered, an analysis of the grid of pixels is carried out in real time to create vector objects adapted to the process of ray-launching, with a local study of the environment of the point of impact being carried out in order to determine on the one hand, if the point of impact is an element of a façade or of a corner and on the other hand, the angle of said façade or the two angles of the corner of two façades that construct the point, once the immediate environment is determined, the ray continues its path, either reflected if the point of impact is an element of a façade, or diffracted and scattered if the point of impact is the corner formed by two façades.

According to an advantageous alternative of the second embodiment of the method according to the invention, when the point of impact is detected at the time of launching the analysis of the grid of pixels in real time and before a local study of the environment of the point of impact is carried out, it is verified that this point of impact has not yet been analyzed, if this is not the case the ray continues its path, if this is the case the analysis of the point of impact is authorized, then once the analysis has been executed the environment of the point of impact is memorized in order to be used again in the rest of the ray-launching process and the ray continues its path.

The method of predicting the radio field level and/or the duration of radio propagation is also noteworthy in that the rays are launched in all of the horizontal directions by using a small increment, with each launching of a ray being carried out in an optimized manner, i.e. a ray is launched according to a given angle only if it is expected that this ray will have a significant impact on the prediction, with such a prediction being obtained by learning when preceding ray-launchings according to neighboring angles had an impact on the prediction.

As such, ray-launching in all of the horizontal directions with a small increment, i.e. a step that is sufficiently small and creating this learning, has for advantageous effect to further and very significantly accelerate the calculations.

SUMMARY DESCRIPTION OF THE FIGURES

Other advantages and characteristics shall appear more clearly in the following description of preferred embodiments of the method according to the invention in reference to the annexed figures provided by way of a non-restricted example.

BEST MODE OF CARRYING OUT THE TECHNICAL INVENTION

For a better apprehension of the object of the invention, a few reminders follow hereinafter concerning the vertical and horizontal diffractions and the attenuations due to said diffractions.

The estimation and the calculation relating to the attenuation $L_v$ due to the vertical diffraction on the roofs are based on an optimized radial extraction technique which consists in extracting a vertical profile along a radial direction, then in updating only the data that has changed in relation to a previously extracted neighboring radial, then in calculating the attenuations resulting from the diffractions/scatterings over the obstacles detected on the vertical profile and finally in updating the attenuations calculated at each point spanned by said radial. The attenuation $L_v$ results from a diffraction of the hybrid type which is based on a combination of the "knife-edge diffraction" model and of the Walfish-Ikegami model, a model valid for relatively short distances generally inside microcells.

The estimation and the calculation relating to the attenuation $L_h$ due to the horizontal diffraction are based on a technique, unique and ultrafast in this application, of "ray-launching" which is based on the one hand on an estimation of the angles of the obstacles edges, obstacles which, in the urban environment, are for the most part constituted of buildings, and on the other hand of launching rays in all of the horizontal directions with a sufficiently small step, with this ray-launching carried out in an optimized manner i.e. a ray is launched according to a given angle only if it is expected that this ray will have a significant impact on the prediction, with such a prediction being obtained via detection after learning when preceding ray-launchings according to neighboring angles had an impact on the prediction.

Indeed, launching rays in all of the horizontal directions with a sufficiently small step and creating this learning has the substantial advantage of very significantly accelerating the calculations.

For this, in a preferred example of creating a prediction where ray-launching according to a given angle will have a significant impact on the prediction, said prediction results from the comparison to a threshold of the number of pixels for which the prediction was updated by the ray.

The estimation and the calculation of the attenuation $L_v$ due to the vertical diffraction is not of interest to this application, as it is known per se, this invention substantially relates to the horizontal diffraction and the estimation and the calculation of its component of attenuation $L_h$.

The method of prior art usually used is here first of all mentioned succinctly, a method which requires the availability and the utilization of vector databases that model all of the contours of buildings. These vector databases are usually proposed in the form of files, for example in the "Shapefile" or "Mapinfo" format, which contain on the one hand a large number of polygons, with each polygon being accurately described by the coordinates of its successive vertices, and with each polygon representing the contour according to 2 dimensions of a building, and on the other hand an item of information on the height for each polygon representing the height of the corresponding building. As mentioned hereinabove, these databases are voluminous, and because of this they are very cumbersome to manage and utilize, finally they require very substantial investments in order to constitute them, produce them and maintain them given that producing them corresponds to a long and meticulous manual process of creating polygons using aerial or satellite photographs. These bases are particularly cumbersome to manage in the framework of a processing of the ray-launching type, because it is necessary to find the polygons that are located on the path of the rays among the multitude of polygons available in the database, with this constraint giving rise to problems of great complexity with regards to indexing polygons and consequently involving cumbersome processing relatively to the calculating power required.

In this type of database, each element of the land cover is therefore defined by a contour which implies the following information:
- the list of points that constitute the vectors which define the contour of the building,
- a type of land cover within the contour building, forest, etc.,
- the height of the land cover.

In this way, the façade of a building is similar to a vertical surface or respectively a corner of a building is similar to two portions of vertical surfaces of which the projections on the ground correspond to a straight line or respectively to two secant straight lines forming an angle and its vertex. In these conditions, the ray launched is either reflected when it encounters a façade therefore a straight line, or diffracted and scattered when it encounters a corner therefore the vertex of an angle and this being produced and calculated according to conventional laws of geometric optics. To summarize, in order for the predictions and the calculations to be correct it is therefore essential that, on the one hand, when an incident launched ray strikes a façade, the exact angle of the façade be known and on the other hand, when an incident launched ray strikes the vertex of the angle formed by two façades, the two angles of the two façades be also exactly known.

Contrary to this, in order to effectively provide the coverage of a cell within a mobile or cellular telephone network, the method of predicting the radio field level and/or the duration of radio propagation according to the invention also utilizes the technique of ray-launching by using geographical databases, but in a new, remarkable and advantageous way, the databases utilized are directly raster bases and no longer vector bases. A raster base is a grid of pixels in which each pixel carries at least two items of information, an item of information specific to the type of land cover (buildings, trees, bridges, etc.) and an item of information proper to the height of said land cover. In this respect, the contours of obstacles are not explicit and linear, as with the use of a vector base, as they are formed of pixels, and a processing must then be applied to the raster base to linearize the contours of obstacles, i.e. reconstitute the contours of obstacles according to straight lines or segments of straight lines of which the positions and the various angles of interest are known with precision.

As such, vectorization means a method which makes it possible to recognize and transform an object represented by a subset of pixels of a grid of pixels into an object defined by its vector outlines, i.e. by a polygon representing the contour of the object, with the polygon being defined exactly by the x and y coordinates of the successive vertices of the polygon.

Vectorization as such makes it possible to exactly and accurately deduce the position and the angles of the sides of the polygon as well as the position of its vertices by simple geometrical laws, in other terms the angles and positions of the façades and of the corners of the building represented by the polygon are accurately known.

Two main embodiments of the method for predicting the radio field level and/or the duration of radio propagation according to the invention shall be described hereinafter, a first embodiment with a vectorization processing beforehand and a second embodiment that directly utilizes the raster databases with the vectorization processing then being carried out on a one-off basis in real time during the ray-launching.

Figure 1A:
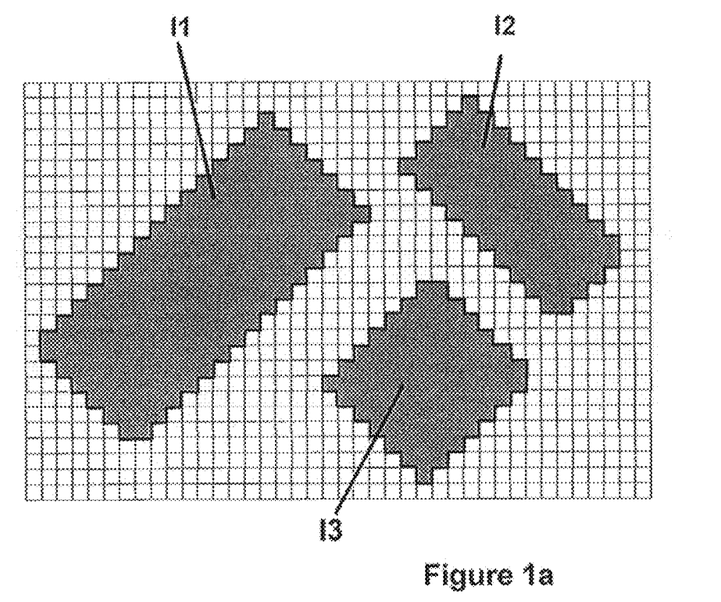
FIGS. 1a and 1b diagrammatically show an example of a step of a first embodiment of the method according to the invention.
Figure 1B:
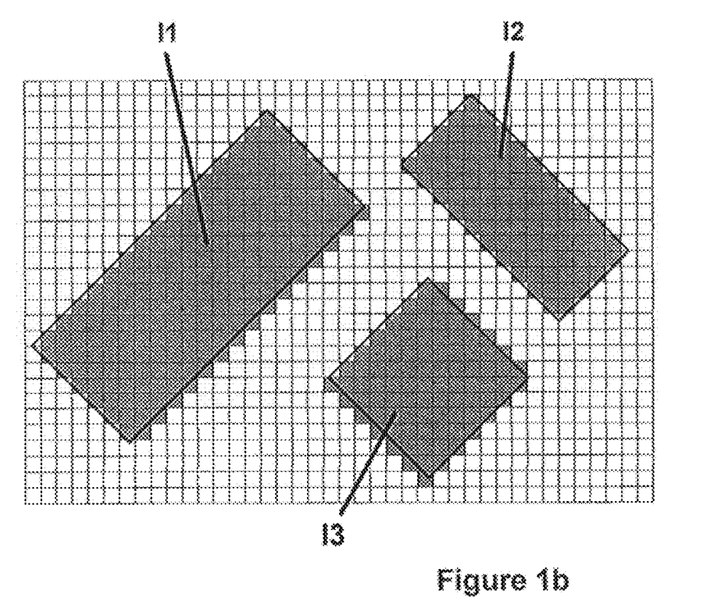

FIGS. 1a and 1b diagrammatically show an example of a step of the first embodiment of the method with preprocessing according to the invention for which a simple configuration of obstacles in the urban environment is proposed, obstacles towards which the fictitious incident rays will be launched.

In this first embodiment, two steps are described to effectively implement the method for predicting the radio field level and/or the duration of radio propagation. A first step consists of a specific and single vectorization preprocessing of the contours of obstacles applied to the raster bases to linearize the contours of obstacles encountered by taking into account only the objects that represent the obstacles and as such retrieve said actual contours of obstacles. This preprocessing is carried out in a unique manner different from conventional methods, since the type of result is known, for example it is obvious that buildings practically all have vertical façades. In this way, knowing the method of processing and the calculating accuracy of the model itself, the specific method of preprocessing does not get bogged down with useless information. Likewise, this preprocessing is based on the very common assumption that buildings have for the most part flat façades with projection in a straight line, which implies that it is possible to retrieve the angle of a façade using a vectorization method via straight-line segments, with such a method consisting for example in finding the straight line which minimizes the average distance between this straight line and the center of the pixels detected as belonging to this façade, with this latter detection being carried out on the one hand by considering only the pixels that have a type of land cover that corresponds to a building and adjacent to a pixel that is not part of a building, while excluding the façade pixels which degrade the average distance with the best straight line possible.

As has been explained hereinabove, FIG. 1a diagrammatically shows, by way of example, three buildings, I1, I2 and I3 of an element of a raster base that corresponds to a geographical grid comprised of points or pixels. Each point or pixel comprises two items of information, the first relates to the type of land cover, buildings, trees, bridges, etc., the second relates to the height of said land cover. Such a base, if the contours of the obstacles were not linearized, would not be able to be effectively utilized for ray-launching since the angles of the façades which do not correspond to reality only have right angles with respect to the pixels. FIG. 1b shows the element of the raster base, with the buildings I1, I2 and I3, of FIG. 1a to which the specific vectorization preprocessing was applied so as to linearize the contours of obstacles by recreating straight-line segments.

As such and furthermore, the vectorization preprocessing utilized is particularly well suited for ray-launching as the vectorization algorithm used during this first step is designed to take into account also the future second step of ray-launching. The vectorization data will not be retained in order to avoid having to directly process vectors which, as has been explained hereinabove, are excessively cumbersome to manage which has for effect to considerably slow down the calculation. However, from said vectors the two following items of vector information are extracted for each pixel, information proper to the type, type 1: inside a building, type 2: building façade, type 3: building corner and information proper to the angles: in the example in FIG. 1b, angles of façades of buildings I1, I2, I3: 45° or 135° or the two angles of corners of buildings: 135° and 45°, 45° and 135°. As such a grid of the types and a grid of the angles are obtained that will make it possible to predict according to the information that they contain the reflection, the diffraction and scattering for each ray launched and allow for the calculation of the global attenuation.

Once this processing has been applied to the base, in a second step, the rays are fictitiously launched, consequently not on vector bases but on grid bases. Two phenomena are then observed concerning said rays which, according to the obstacles encountered, are either reflected or diffracted and scattered while their paths can then be formally predicted while the global attenuation and/or the radio propagation time will be calculated precisely.

Figure 2A:
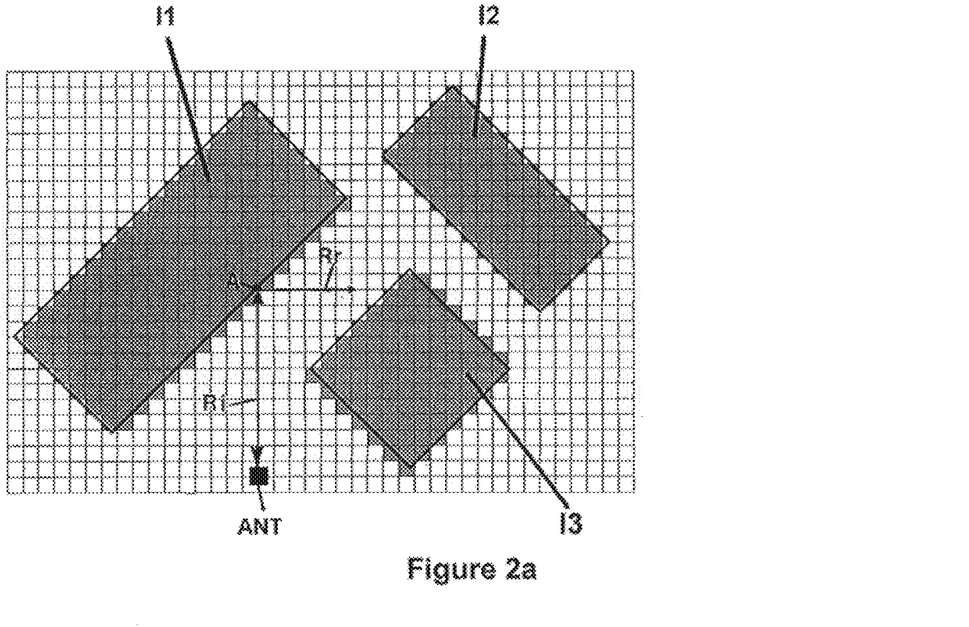
FIGS. 2a and 2b each show an example of a second step of the first embodiment of the method according to the invention.
Figure 2B:
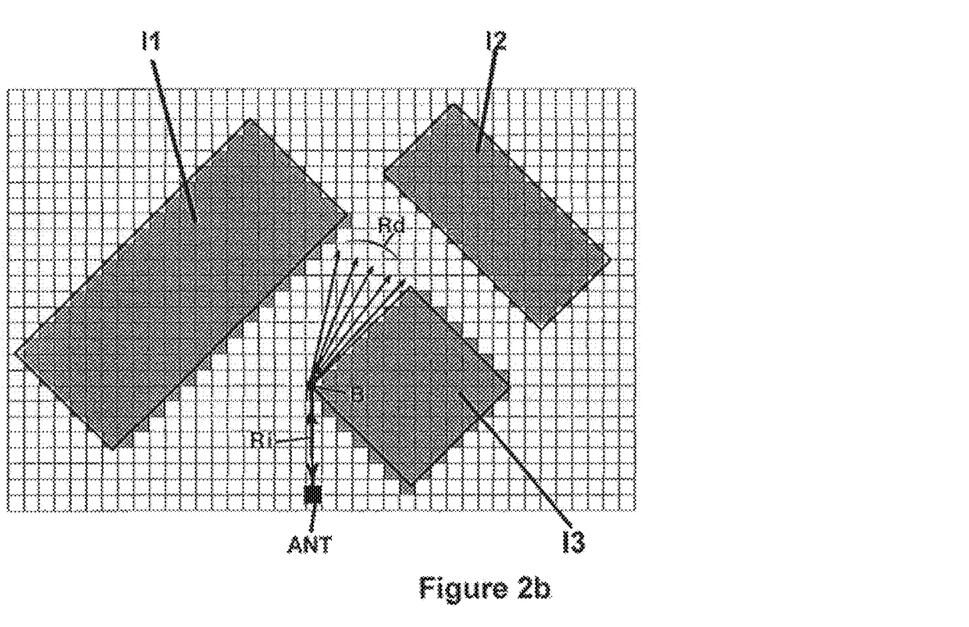

FIGS. 2a and 2b each show, retaining the configuration of the environment of FIGS. 1a and 1b, a second step of the first embodiment of the method according to the invention, second step which therefore corresponds to the ray-launching.

FIG. 2a proposes an example of reflection of an incident ray Ri launched starting from an antenna ANT in the direction of the building I1 and which encounters the latter at a point A. Having created the grid of the types and the grid of the angles makes it possible to precisely know the information proper to this point A. As such, according to the grid of the types, this point A is of type 2, it is located on a façade of the building I1. In this simple example, the façade forms a 45° angle with the direction of the incident ray, information known by the grid of the angles. In this way, it is easy to calculate the angle of the reflected ray Rr using the knowledge of the angle of the incident ray Ri, taken as reference 0° and of the angle of the façade by applying the conventional formula of geometric optics: $\alpha r = 2(\alpha f - \alpha i)$, wherein $\alpha r$ represents the angle of reflection, $\alpha f$ represents the angle of the façade and $\alpha i$ represents the angle of the incident ray. As here the angle $\alpha i = 0°$ and the angle $\alpha f$ 45°, $\alpha r = 90°$ is easily obtained. As such the calculations concerning the phenomenon of reflection are carried out from one to the next.

FIG. 2b proposes an example of diffraction/scattering of an incident ray Ri launched from the antenna ANT in the direction of the building I3 and which encounters the latter at a point B. The grid of the types and the grid of the angles make it possible to know the information proper to this point B. As such, according to the grid of the types, this point B is of the type 3, it corresponds to a corner of the building I3. In this simple example, the corner is formed by two angles, a first angle β1 135° and a second angle β2=45° with respect to the direction of the incident ray Ri, information known by the grid of the angles. The calculation of the directions of the diffracted/scattered rays Rd is carried out by applying the known laws of conventional geometric optics, this calculation therefore depends here on the two angles β1 and β2 which define at point B the corner of the building I3, with these two angles being precisely known by the grid of the angles.

Figure 3A:
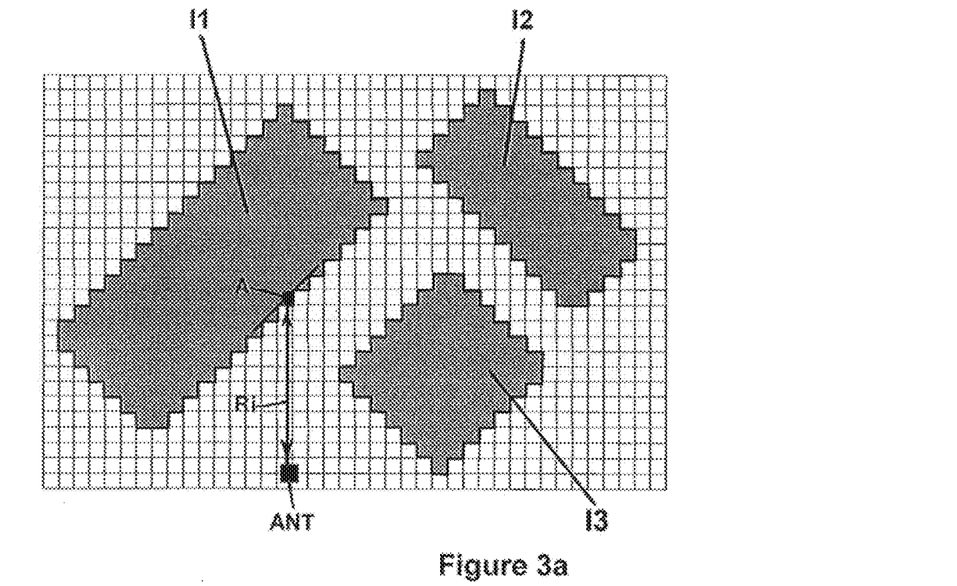
FIGS. 3a and 3b show, for a second embodiment of the method according to the invention, the description of a first step of detecting a point of impact between a launched ray and an obstacle encountered and of a second step of analyzing said point of impact.
Figure 3B:
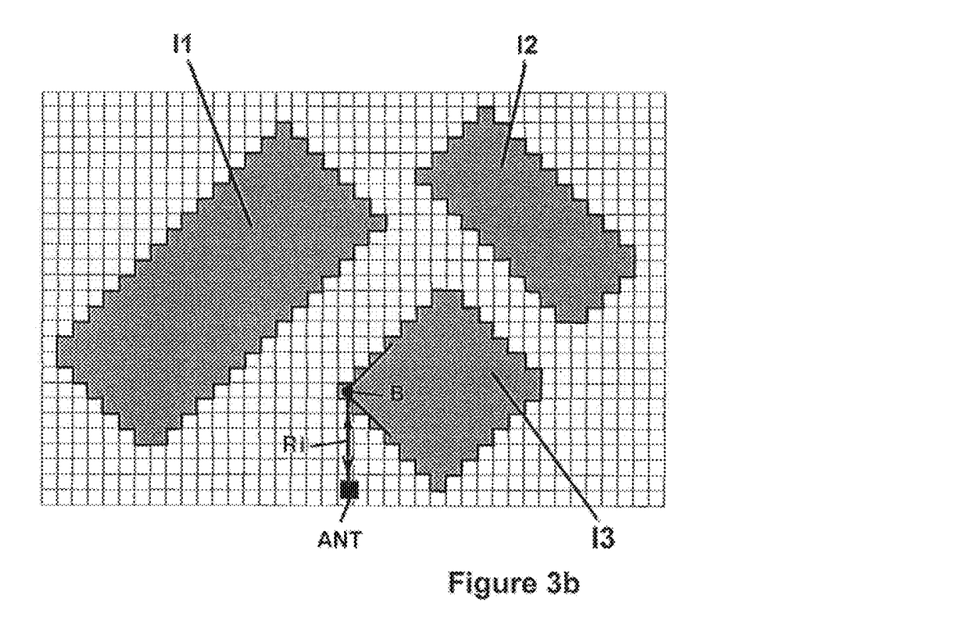

The description of a second embodiment of the method according to the invention, which also frees from having to use cumbersome vector bases follows. FIGS. 3a and 3b diagrammatically show an example of the second embodiment directly utilizing raster databases during the entire unfolding of the ray-launching process, and this in order to implement in real time the method according to the invention. The configuration of simple obstacles in the urban environment proposed is identical to that already proposed with the first embodiment, obstacles towards which the fictitious incident rays are launched.

As such, the fictitious rays are launched directly on the representation of the raster base, each one in a direction of a solid angle, covering the space of said solid angle. The algorithm for launching rays over the raster base used here consists in scanning its path at each point and each time that said ray encounters an obstacle, with this detection carried out by comparing the height of the ray with the height of the obstacle at the point considered, a one-off analysis of the raster database is then carried out in real time in order to create vector objects adapted to the ray-launching process, with a local study of the environment of the point of impact being carried out for this, then the ray-launching process is continued, this from one to the next.

In a remarkable manner three steps are travelled during the ray-launching process during which the raster bases are directly utilized. A first step is as such constituted by the detection of the point of impact between the incident ray launched and an obstacle encountered, a second step consists in analyzing the point of impact in order to create vector objects adapted to the ray-launching process while a third step shows the continuation of the ray-launching.

FIGS. 3a and 3b will make it possible to follow the unfolding of the first step of detecting a point of impact and of the second step of analyzing said point of impact, with FIG. 3a relating to the example of a point of impact on the façade of a building while FIG. 3b concerns a point of impact on the corner of a building.

In a first step, each point of the incident ray launched Ri from the antenna ANT is followed in order to detect if this ray encounters a building I1, I2, I3, and when this is the case, the point of impact is as such detected and determined. Two cases are possible according to whether the point is located on the façade of a building I1, point A in the example of FIG. 3a or on the corner of a building I3, point B, in the example of FIG. 3b. Once the point of impact is detected and determined during the first step, the second step begins and is dedicated to the creation of vector objects adapted to the ray-launching process during which a one-off analysis of the immediate environment of point A or of point B is carried out so as to, on the one hand, specify if the point A or respectively the point B is an element of a façade or respectively of a corner formed by two façades and, on the other hand, specify the angle of the façade or the two angles of the corner whereon point A or point B is located. In the example of FIG. 3a, the point A is an element of a façade of the building I1 of which the angle with the incident ray Ri is, in this example, equal to 45°. In FIG. 3b, the point B is an element of a corner formed by two façades of which the angles with the incident ray Ri are, in this example, respectively 135° and 45°.

A local vectorization or linearization algorithm is implemented for this, for example the previously described algorithm that uses the adaptation of straight lines to the façade pixels, said algorithm is perfectly adapted to ray-launching as it is designed to take into account the subsequent third step of continuation of the ray-launching.

Figure 4A:
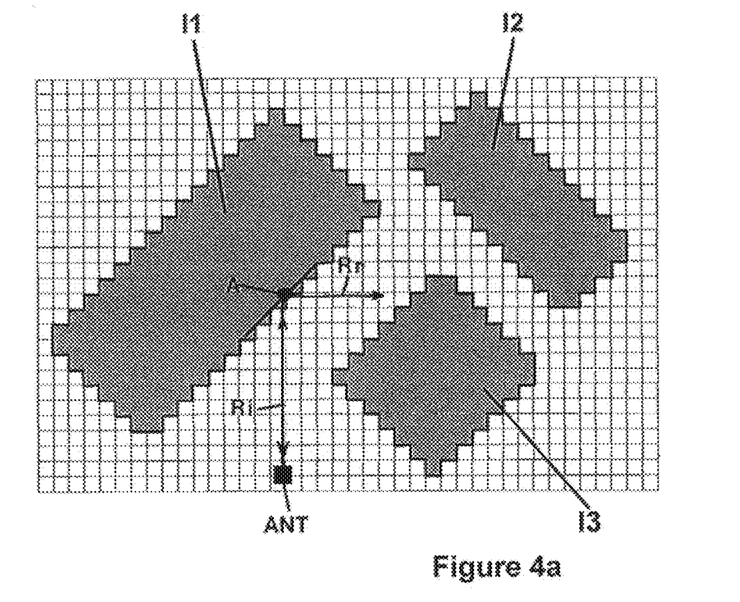
FIGS. 4a and 4b show a third step proper to the continuation of the ray-launching of the second embodiment of the method according to the invention.
Figure 4B:
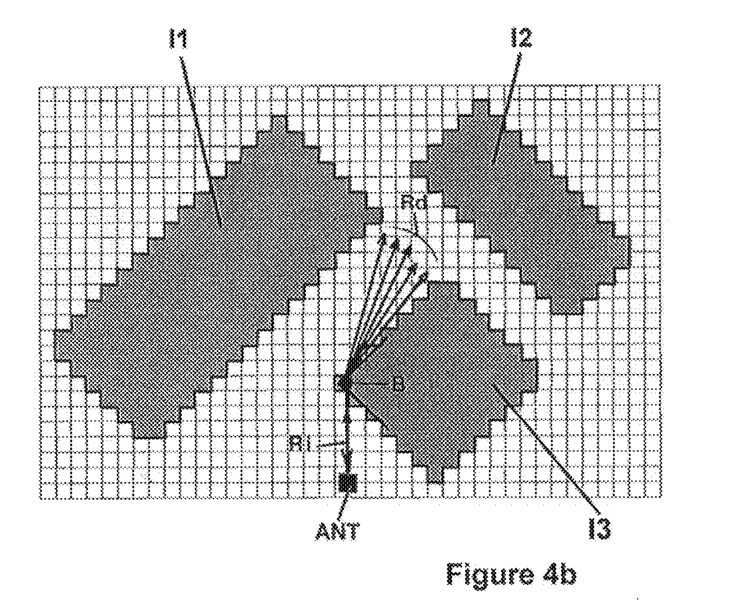

FIGS. 4a and 4b show the third step proper to the continuation of the ray-launching. As such, as the immediate environment of the point A or of the point B is perfectly and accurately determined during the unfolding of the first and second steps, in the third step the ray-launching can be continued according to the normal methods.

FIG. 4a shows an example of reflection of an incident ray Ri launched starting from an antenna ANT in the direction of the building I1 and which encounters the latter at a point A. The second step made it possible to precisely know the information proper to this point A. As such, it was determined that the point A is located on a façade of the building I1 and that, in this simple example, the façade forms a 45° angle with the direction of the incident ray. In the same way as with the first embodiment, it is easy to calculate the angle of the reflected ray Rr using the knowledge of the angle of the incident ray Ri, taken as reference 0° and of the angle of the façade by applying the conventional formula of conventional geometric optics: $\alpha r=2(\alpha f-\alpha i)$, wherein $\alpha r$ represents the angle of reflection, $\alpha f$ represents the angle of the façade and $\alpha i$ represents the angle of the incident ray. As here the angle $\alpha i=0°$ and the angle $\alpha f$ 45°, $\alpha r$ 90° is easily obtained. As such, the ray-launching can be continued and the attenuation calculations concerning the phenomenon of reflection are carried out from one to the next.

FIG. 4b proposes an example of diffraction/scattering of an incident ray Ri launched from the antenna ANT in the direction of the building I3 and which encounters the latter at a point B. The second step made it possible to precisely know the information proper to this point B. As such, it was determined that the point B corresponds to a corner of the building I3. In this simple example, the corner is formed by two angles, a first angle β1=135° and a second angle β2=45° with respect to the direction of the incident ray Ri. The calculation of the directions of the diffracted/scattered rays Rd is carried out by applying the laws known to conventional geometric optics, this calculation also depends here on the two angles β1 and β2 which define at point B the corner of the building I3, with these two angles being known precisely, the ray-launching can be continued.

An advantageous alternative of the second embodiment of the method according to the invention is now described. This alternative is in fact a direct extension of the second embodiment but which combines the advantages of the two previously disclosed embodiments. This extension is inserted between the first and the third step of the second embodiment.

As such, when the point of impact is detected, at the time of launching the analysis of the raster database in real time and before a local study of the environment of the point of impact is carried out, it is verified that this point of impact has not yet been analyzed, if this is not the case and therefore the environment of the point of impact has already been analyzed the ray continues its path, if on the contrary this is the case, the analysis of the point of impact is authorized, once the analysis has been executed the environment of the point of impact is memorized in order to be used again in the rest of the ray-launching process and the ray continues its path.

The local study of the environment of the point of impact makes it possible to determine on the one hand, if the point of impact is an element of a façade or of a corner and on the other hand, the angle of said façade or the two angles of the corner of two façades that construct the point. This local study is carried out by a method for detecting façades and corners which consists in identifying one or two segments of straight lines of which the positions and angles are known with precision, with this or these segments of straight lines accurately describing the position and the orientation of the façade if the point of impact is an element of a façade, and the position and the orientation of the two façades that form the corner if the point of impact is an element of a corner. The point of impact is finally determined as an element of a façade if a single straight-line segment or two straight-line segments with a similar orientation were identified previously, otherwise the point of impact is an element of a corner, and the angle of the façade or the angles of the façades forming the corner are obtained by the orientation of the single or of the two straight-line segments identified.

More precisely, the identification of the single or of the two straight-line segments of which the positions and angles are known with precision is carried out by minimizing the distance between this single or these two straight-line segments and all of the pixels detected as belonging to the façade or to the two façades that form the corner, with this latter detection carried out on the one hand by initially selecting the pixel of the point of impact, then by iteratively selecting any pixel adjacent to an already selected pixel which is characterized on the one hand by a type of land cover identical to the point of impact and itself adjacent to a pixel that has a type of land cover different from the point of impact, and on the other hand that does not degrade the distance between the single or the two best straight-line segments with all of the already selected points.

Consequently, all of the steps of the second embodiment remain practically identical, with the only modification being the useful saving to memory of the results of the calculations proper to the immediate environment of an already analyzed point of impact and therefore of the information relating to the types of obstacles and the angles formed by said obstacles encountered. The raster database is thus linearized from one to the next.

In this way, thanks to this alternative it is permitted to save in the form of data grid the vector data calculated in the immediate environment of the point of impact, i.e. around said point of impact, so that the latter, once saved, can subsequently be used again when another launched ray encounters the immediate environment of the already analyzed point of impact. As such, the initial base of objects containing vector information is advantageously enriched as the execution unfolds of the ray-launching calculations, which has for main advantage to have a significant gain in rapidity of the method since the calculations already carried out around a point of impact during a preceding ray-launching are not re-executed.

Indeed according to this alternative, each time that a ray is launched towards or in the vicinity of a point of impact for which the calculations have already been carried out, the second step of analyzing the immediate environment of a point of impact of the second embodiment of the method is not implemented, which reverts to applying identically the method according to the first embodiment with preprocessing.

Recall that the calculation of the global attenuation $L_h$ in the case of the phenomenon of horizontal diffraction based on ray-launching is conventionally carried out by using the following formula:

$$L_h = G_{ant} + \Sigma_{k=1}^{n} L_{los-k} + \Sigma_{k=1}^{n-1} \text{Diff}_k + \Sigma_{k=1}^{n-1} \text{Refl}_k$$

formula wherein:

$G_{ant}$ shows the antenna gain, n is the number of different segments of free-space propagation between the emitter and the receiver, with each segment being created by a diffraction or a reflection, $L_{los-k}$ is the free-space attenuation of the segment of index k, $\text{Diff}_k$ is the loss due to the diffraction between the segment of index k and the segment of index k+1, $\text{Refl}_k$ is the loss due to the reflection between the segment of index k and the segment of index k+1.

Moreover the duration of radio propagation is obtained directly by the calculation of the ratio of the total distance travelled by the ray over the propagation speed, which corresponds therefore to the sum of the segments of free-space propagation between the emitter and the receiver, with each segment being created by a diffraction or a reflection.

The radio channel profile is entirely described by the set of couplets [global attenuation, propagation time] of each ray launched from the transmitter that reaches a given receptor, with this radio channel profile giving as such a measurement of the dispersion of the radio signal caused by the multi-paths.

Also and advantageously, according to a preferred embodiment of the method of predicting the radio field level and/or the duration of propagation, when the point of impact of a ray is detected, the position of the point of impact and angle of incidence of the ray on the point of impact couplet can be memorized in a so-called couplet database, with the ray then continuing its path by reflection, or diffraction/scattering following the point of impact solely if the point of impact and angle of incidence couplet of the ray is significantly different from the couplets memorized during ray-launching carried out previously.

Recall that the method according to the invention advantageously applies to the predicting of the radio field level and/or the duration of radio propagation of a mobile telephone network, but it could also very well apply, simply through analogy, to a method of simulating the electromagnetic field level based on a ray-launching process over raster database or to a method of simulating the sound field level also based on a ray-launching process over raster database.

Various modifications within the reach of those skilled in the art are of course possible without however leaving the scope of the invention.

The invention claimed is:

1. A method for predicting a radio field level and/or a duration of radio propagation of a mobile telephone network for coverage of a cell, the method comprising:

accessing, by a calculator, at least one database comprising a grid of pixels, each pixel comprising a type of land cover and a height of the land cover;

applying, by the calculator, a vectorization preprocessing to the grid of pixels to:

linearize contours of obstacles in the grid of pixels by:
considering only pixels having a type of land cover corresponding to an obstacle; and
identifying the contours of the obstacles by:
identifying pixels having a non-zero height of the land cover; and
identifying straight-line segments in the grid of pixels representative of a position and an orientation of facades of the obstacles;
produce a grid of feature types, the feature types comprising one or more of an inside of an obstacle, a facade of an obstacle, or a corner of an obstacle;
produce a grid of feature angles, the feature angles comprising one or more of a facade angle or a corner angle,
wherein the grid of feature types and the grid of feature angles allow prediction of a reflection and a diffraction and scattering of a ray launched across the grid of pixels;
fictitiously launching, by the calculator, rays over the grid of pixels;
applying, by the calculator, a vectorization processing to the grid of pixels to linearize the contours of the obstacles encountered while fictitiously launching the rays over the grid of pixels, the rays being either reflected or diffracted and scattered according to the obstacles encountered; and
calculating, by the calculator, a global attenuation and/or the duration of radio propagation,
wherein the vectorization processing of the contours of the obstacles applied to the grid of pixels linearizes the contours of the obstacles encountered by forming straight lines based on the grid of feature types and the grid of feature angles, the straight lines accurately describing a position and an orientation of the facades of the corresponding obstacle encountered.

2. A method for predicting a radio field level and/or a duration of radio propagation of a mobile telephone network for coverage of a cell, the method comprising:
accessing, by a calculator, at least one database comprising a grid of pixels, each pixel comprising a type of land cover and a height of the land cover;
fictitiously launching, by the calculator, rays over the grid of pixels;
applying, by the calculator, a vectorization processing to the grid of pixels to linearize contours of obstacles encountered while fictitiously launching the rays over the grid of pixels, the rays being either reflected or diffracted and scattered according to the obstacles encountered; and
calculating, by the calculator, a global attenuation and/or the duration of radio propagation, wherein the vectorization processing of the contours of the obstacles applied to the grid of pixels linearizes the contours of the obstacles encountered by forming straight lines whose positions and various angles are known, the straight lines accurately describing a position and an orientation of the facades of the corresponding obstacle encountered,
wherein the fictitious launching of rays comprises a ray launched directly over the grid of pixels in a direction of a solid angle, covering a space of the solid angle, the ray having a path along each point scanned and each time that the ray encounters an obstacle and that a point of impact is detected, with this detection carried out by comparing a height of the ray with a height of the point considered, an analysis of the grid of pixels is carried out in real time in order to create vector objects adapted to the fictitious launching of rays, with a local study of the environment of the point of impact being carried out in order to determine whether the point of impact is an element of a facade or of a corner and correspondingly an angle of the facade or two angles of the corner of two façades that construct the point, once the immediate environment is determined, the ray continues its path, either reflected when the point of impact is an element of a facade, or diffracted and scattered when the point of impact is the corner formed by two façades.

3. The method of claim 2, further comprising, when the point of impact is detected at the time of launching the analysis of the grid of pixels in real time and before a local study of the environment of the point of impact is carried out, verifying, by the calculator, that this point of impact has not yet been analyzed, and when this is not the case, the ray continues its path, and when this is the case, the analysis of the point of impact is authorized.

4. The method of claim 3, wherein the local study of the environment of the point of impact in order to determine whether the point of impact is an element of a facade or of a corner and correspondingly the angle of the facade or the two angles of the corner of two façades that construct the point comprises identifying one or two straight-line segments having known positions and angles, with this or these straight-line segments accurately describing a position and an orientation of the facade if the point of impact is an element of a facade, and a position and an orientation of the two façades that form the corner if the point of impact is an element of a corner, with the point of impact being finally determined as an element of a façade when a single straight-line segment or two straight-line segments with a similar orientation were identified previously, otherwise the point of impact (A, B) is an element of a corner, and the angle of the facade or the angles of the façades forming the corner are obtained by the orientation of the single or the two straight-line segments identified.

5. The method of claim 4, wherein the identification of the single or the two straight-line segments of which the positions and angles are known is carried out by minimizing a distance between this single or these two straight-line segments and all of the pixels detected as belonging to the façade or to the two façades that form the corner, with this latter detection carried out by initially selecting a pixel of the point of impact, then by iteratively selecting any pixel adjacent to an already selected pixel which is characterized by a type of land cover identical to the point of impact and itself adjacent to a pixel that has a type of land cover different from the point of impact, and that does not degrade the distance between the single or the two best straight-line segments with all of the already selected points.

6. The method of claim 1, wherein the rays are launched in all horizontal directions by using a small increment, each ray launched according to a given angle only when the ray is expected to have a significant impact on the prediction, the prediction being obtained by learning when preceding ray-launchings according to neighboring angles had a significant impact on the prediction.

7. The method of claim 6, wherein the prediction that ray-launching according to a given angle will have a significant impact on the prediction is based on a comparison to a threshold of a number of pixels for which the prediction has been updated by the ray.

8. The method of claim 1, further comprising, when a point of impact of a ray is detected, storing in in couplet database a couplet comprising a position of the point of impact and an angle of incidence of the ray on the point of impact, wherein the ray continues its path by reflection or diffraction/scattering following the point of impact solely when the point of impact and angle of incidence couplet of the ray is significantly different from other stored couplets.

9. The method of claim 2, wherein the rays are launched in all horizontal directions by using a small increment, each ray launched according to a given angle only when the ray is expected to have a significant impact on the prediction, the prediction being obtained by learning when preceding ray-launchings according to neighboring angles had a significant impact on the prediction.

* * * * *